Dec. 22, 1959 — L. J. WIRTH — 2,918,239
EXPANSION-PERMITTING HANGER
Filed May 16, 1956

INVENTOR
LEO J. WIRTH
BY
ATTORNEY

United States Patent Office 2,918,239
Patented Dec. 22, 1959

2,918,239

EXPANSION-PERMITTING HANGER

Leo J. Wirth, Baltimore, Md., assignor to The Martin Company, a corporation of Maryland Application May 16, 1956, Serial No. 585,328

6 Claims. (Cl. 248—55)

This invention relates to hangers for supporting ducts and the like, and more particularly to an improved and simplified device for hanging or otherwise supporting a section of ducting upon a bulkhead where the ducting and/or the bulkhead are subjected to temperature changes sufficient to cause relative movement therebetween.

Where ducting, piping or the like is mounted upon a bulkhead or other supporting structure, and the ducting or the bulkhead is subjected to wide variations in temperature, for example, substantial relative movement between the two may result. This of course presents very definite problems in connection with the supporting of the duct, to avoid buckling of the duct, or otherwise subjecting it to extraordinary stresses.

Heretofore, where ducting has been subject to varying temperatures, it has been proposed to provide hangers or supports adapted to permit a certain amount of movement of the duct relative to the main supporting structure. However, the various prior proposals have been inadequate or undesirable in one or more respects for certain applications. Accordingly, the present invention provides an improved, inexpensive and wholly practical device for supporting or hanging ducting in a firm and dependable manner while permitting such movement of the ducting with respect to the supporting structure as may be occasioned by the normal expansion and contraction of the ducting or the supporting structure.

More specifically, the invention provides a novel and improved mounting device for ducting wherein one part of the device is rigidly secured to the duct, while another part of the device is secured to a bulkhead or other main supporting structure, the two parts being secured together in such manner as to permit limited relative movement, thereby to accommodate changes in length of the ducting, while at all times firmly gripping and supporting it.

An object of this invention is to provide a duct-supporting device that will furnish positive, relatively friction-free support for the duct during changes of length of the duct.

A more specific objetc of this invention is to provide a duct-supporting device that can be assembled and disassembled quickly, which provides rigid support for the duct so as to prevent lateral or sideways movement thereof, and which causes minimum longitudinal restraint upon the duct so as to accommodate changes in length.

Other objects and advantages of this invention will be apparent from the following description and accompanying drawing, in which.

Figure 1:
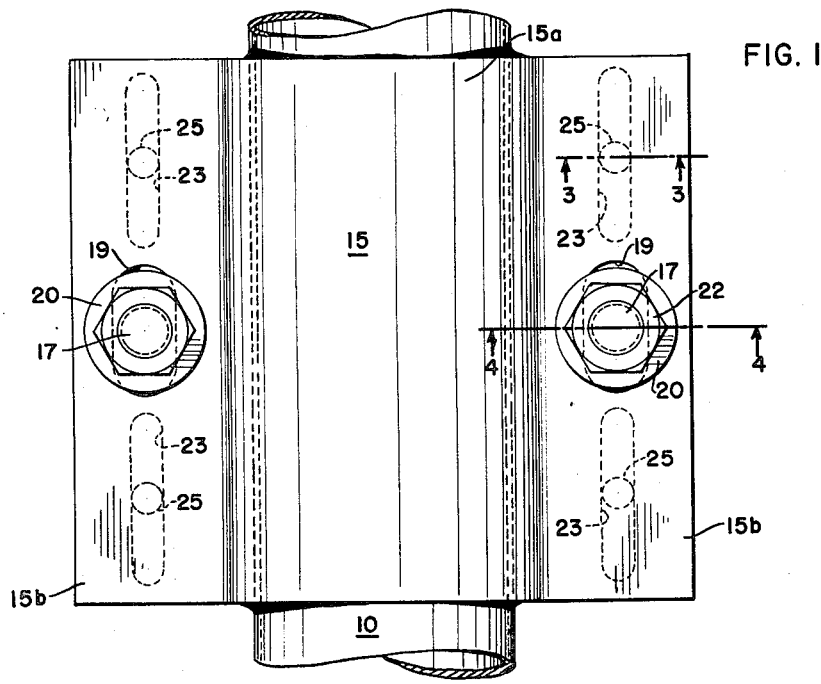
Fig. 1 is a top plan view of the new mounting device, shown with a length of duct gripped therein.
Figure 2:
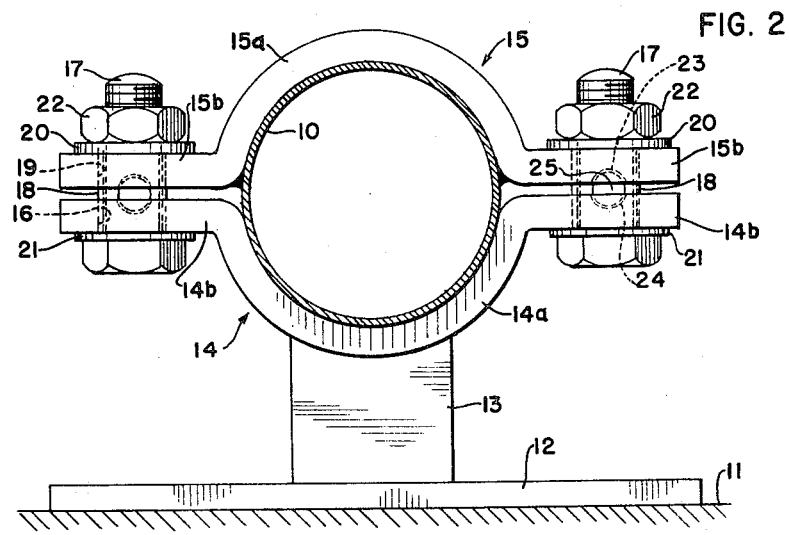
Fig. 2 is an end elevation of the device of Fig. 1, showing the duct engaging and supporting members in assembled relation.

Referring initially to Figs. 1 and 2, the numeral 10 designates a length of ducting to be supported by a suitable foundation 11, which may be a bulkhead, floor, ceiling, or other structure. Rigidly secured on the foundation 11, by any suitable means, is a base plate 12 having a spacer 13 projecting therefrom. At the outer end of the spacer 13 is rigidly mounted a fixed duct support 14. The support 14 as shown in the drawing is generally in the form of a cradle, having a semi-cylindrical central portion 14a and oppositely extending coplanar flanges 14b. As indicated in Fig. 2, the upper surfaces of the flanges 14b lie slightly below the horizontal plane which would contain the central axis of the semi-cylindrical portion 14a.

Positioned directly above the fixed duct support 14 is an oppositely disposed duct-engaging member 15, having a semi-cylindrical central portion 15a and oppositely extending flanges 15b. In the illustrated and preferred form of the invention, the duct-engaging member 15 is substantially identical to the duct-supporting member 14, but is positioned in inverted relation thereto whereby the semi-cylindrical portions 14a, 15a together define a generally cylindrical passage parallel to the base plate 12 and of such size as to closely receive a section of duct 10. While duct 10 is shown to be circular in cross section, it is to be understood that such is not necessarily the case, for the duct could be square, rectangular, or any other configuration of cross section. For instance, the duct supported by this device could be wave guide, which is generally rectangular in cross section. The support 14 and the duct-engaging member 15 are properly selected in each instance so that the configuration of the inner or recessed portion of members 14, 15 will correspond to the shape of the exterior of the duct.

In accordance with the teachings of the invention, the duct 10 is received comparatively loosely in the supporting member 14 and is adapted to be movable with respect thereto. On the other hand, the duct-engaging member 15 is received over and secured to the outer portion of the duct 10, so that the flanges 15b lie face to face with the flanges 14b, substantially as shown in Fig. 2.

In each of the flanges 14b of the duct-supporting member 14 is an opening 16 in which is received a bolt 17 surrounded by a cylindrical sleeve 18. The bolts 17 extend upwardly, through slots 19 provided in the flanges 15b of the duct-engaging member 15, and threaded end portions of the bolts 17 project above the tops of the flanges 15b, to receive nuts 22, as shown. The slots 19 are elongated in a direction parallel to the duct 10, permitting relative movement between the duct-engaging and supporting members 15, 14 in a longitudinal direction. As will be discussed in more detail hereinafter, a plurality of balls 25 located in appropriate grooves 23, 24 form the support for member 15 so as to permit it to have relative motion with respect to member 14.

Figure 4:
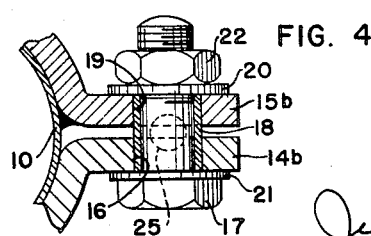
Fig. 4 is an enlarged fragmentary section view taken along line 4—4 of Fig. 1.

Referring now to Fig. 4, the cylindrical sleeves 18 surrounding the bolts 17 have a length greater than the combined thickness of the flanges 14b, 15b, to prevent the flanges from being brought together so tightly as to impair free rolling motion of the bolts 25 on the occasion of longitudinal motion of member 15 with respect to member 14. The ends of the sleeves in effect form shoulders against which washers 20, 21 are held when nuts 22 are tightened. The arrangement, therefore, is such that when the nuts are tightened, the washers 20, 21 are firmly clamped in a fixed space relation. Alternately, it is contemplated that the bolts 17 may be provided with shoulders near their ends, against which the washers 20 may be firmly clamped when the nuts are tightened.

Provided in the lower face of each flange 15b are one or more longitudinally disposed grooves 23, with one of such grooves preferably being located at each side of each bolt 17 in the manner shown in Figure 1. An equal number of similarly placed grooves 24 are disposed in the upper face of each flange 14b so that when the members 14 and 15 are placed in assembled relation, a plurality of pairs of opposed grooves 23 and 24 are formed. While four such pairs of opposed grooves and two bolts 17 are shown, it is to be understood that any reasonable number of such pairs of grooves, and any reasonable number of bolts may be employed within the spirit of this invention.

Figure 3:
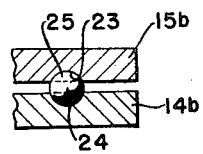
Fig. 3 is an enlarged fragmentary section view taken along line 3—3 of Fig. 1.

Each pair of opposed grooves 23, 24 define a substantially cylindrical channel, as is best seen in Fig. 3. Within each such channel are received the anti-friction balls or rollers 25, which are normally positioned centrally between the ends of the grooves. The balls 25 support the upper or duct-engaging member 15 in spaced relation to the lower or duct-supporting member 14, and as may be desired, one or more balls are placed in each pair of grooves 23, 24. In accordance with the invention, the size of the grooves 23, 24, anti-friction balls 25 and sleeves 18 is such that usually only a slight pressure, if any, is exerted upon the balls 25 in the assembled device. Thus, while the parts are firmly held in assembled relation, the upper or duct-engaging member 15 is free to move longitudinally with respect to the lower or duct-supporting member 14, within limits determined by the dimensions of the slots 19 and grooves 23, 24.

In order to mount a duct utilizing this device, the base 12, carrying the tube-supporting member 14 is rigidly secured to the supporting structure 11 by bolts or other suitable means, not shown. The duct 10 is then placed in the central recess 14a of the duct-supporting member 14, and a preliminary assembling of members 14 and 15 is made so that the most appropriate location on the duct for the member 15 to be secured can be noted. Then, the duct is removed from member 14 and the member 15 welded or otherwise secured in the proper position on the duct so that good alignment between the members 14, 15 will occur when the duct 10 is again placed in central recess 14a of member 14. The balls 25 are then placed in grooves 24, and the member 15 is brought into assembled relation with member 14, with duct 10 therebetween. Washers 20 and 21 and sleeves 18 are then assembled upon the bolts 17 in the correct relation, and the nuts 22 are threaded upon the bolts until each sleeve 18 is tightly held between its respective washers 20 and 21.

As previously mentioned, the presence of sleeves 18 prevents the members 14, 15 from being brought so closely together as to impair free rolling movement of each ball 25 in its respective grooves 23, 24. Thus, in the complete assembly, any movements of the duct 10, in expanding or contracting in a longitudinal direction, will cause the duct-engaging member 15 to shift longitudinally with respect to the supporting member 14, the members being free to so move in a relatively friction-free manner while at the same time firmly supporting the duct.

As will be readily appreciated, the new device is of a simplified and inexpensive nature, and may be made of lightweight materials, so as to be suitable for use in aircraft, for example. The device is equally effective in any position, and serves to firmly support and confine a duct, even when lateral stresses are applied thereto.

One of the important features of the new device is that the duct is rigidly secured to one of the parts, and the part is adapted for relatively friction-free but guided and confined movement. Substantial expansion or contraction of the duct is thus provided for, while at the same time avoiding any looseness in the support to permit undesirable vibratory or other movements of the duct.

It should be understood, however, that the specific device shown and described herein is intended to be illustrative only, as changes may be made therein without departing from the clear teachings of the invention.

Reference should therefore be made to the following appended claims in determining the full scope of the invention.

I claim:

1. An expansion-permitting duct mounting device comprising in combination a fixed duct-supporting member having a recess therein for receiving a duct, and having oppositely extending flanges, a duct-engaging member having a recess therein for receiving a duct and having oppositely extending flanges, said duct supporting and engaging members being positioned with respective flanges of one of said members adjacent the flanges of the other of said members, so that said members together define a circular duct receiving means, said duct-supporting member having only a frictional engagement with a duct supported thereby, whereas said duct-engaging member is adapted to be rigidly secured to a duct, means engaging adjacent flanges for limiting the separation thereof and with said duct-engaging member for providing torsional rigidity, while permitting relative longitudinal movement of said members in the direction of the axis of the duct, and anti-friction elements between adjacent pairs of said flanges.

2. A duct mounting device according to claim 1, further characterized by said flanges having longitudinally disposed grooves therein facing corresponding grooves in adajcent flanges, and said anti-friction elements comprising spherical elements received in said grooves.

3. A duct mounting device according to claim 2, further characterized by said means engaging said flanges comprising bolts extending through adjacent pairs of said flanges, and spacer means between the ends of said bolts to limit the pressure applied to said flanges by said bolts.

4. A duct mounting device according to claim 3, further characterized by said spacer means comprising sleeves received over said bolts.

5. An expansion-permitting duct mounting device comprising a pair of substantially semi-circular members having recessed duct-engaging central portions, and adapted to be secured together to define a substantially circular device, each of said members having a pair of flanges thereon, disposed on opposite sides of said duct-engaging portions, means engaging adjacent flanges of said pair of members for limiting the separation thereof, but allowing relative motion between said members in the direction of the axis of the duct, one of said members being adapted to form at least part of the support for a duct with which said device is employed, but having a slidable relation with the duct, the other of said members being adapted to be secured to such a duct so as to move therewith during any expansion and to provide torsional rigidity therefor, anti-friction elements disposed on each side of said duct between each pair of adjacent flanges, whereby as said duct is caused to expand lengthwise, one of said members is adapted to move with respect to the other, while still preventing positively the dislocation of said duct from its support.

6. A duct mounting device according to claim 5, further characterized by said means to engage said flanges being located intermediate the ends of said flanges, and said anti-friction means comprising rolling elements between said flanges and spaced longitudinally of said means to engage, on opposite sides thereof.

References Cited in the file of this patent

UNITED STATES PATENTS

| 652,075 | Black | June 19, 1900 |
| 2,002,103 | Wheeler | May 21, 1935 |
| 2,715,003 | Powell | Aug. 9, 1955 |
| 2,795,967 | Wahl | June 18, 1957 |

FOREIGN PATENTS

| 14,647 | Great Britain | Apr. 15, 1909 |